(12) United States Patent
Gledhill et al.

(10) Patent No.: US 10,695,892 B2
(45) Date of Patent: *Jun. 30, 2020

(54) PDC CUTTER WITH CHEMICAL ADDITION FOR ENHANCED ABRASION RESISTANCE

(71) Applicant: DIAMOND INNOVATIONS, INC., Worthington, OH (US)

(72) Inventors: Andrew Gledhill, Westerville, OH (US); Christopher Allen Long, Westerville, OH (US); Valeriy Konovalov, Lewis Center, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 643 days.

This patent is subject to a terminal disclaimer.

(21) Appl. No.: 14/582,542

(22) Filed: Dec. 24, 2014

(65) Prior Publication Data

US 2015/0367482 A1 Dec. 24, 2015

Related U.S. Application Data

(63) Continuation-in-part of application No. 13/926,696, filed on Jun. 25, 2013, now Pat. No. 9,476,258.

(51) Int. Cl.
B24D 3/10 (2006.01)
E21B 10/567 (2006.01)
(Continued)

(52) U.S. Cl.
CPC ............... B24D 3/10 (2013.01); B22F 7/06 (2013.01); B24D 18/0009 (2013.01); B24D 99/005 (2013.01); C22C 1/00 (2013.01); C22C 26/00 (2013.01); E21B 10/00 (2013.01); E21B 10/567 (2013.01); B01J 3/062 (2013.01); B22F 2005/001 (2013.01); E21B 2010/561 (2013.01)

(58) Field of Classification Search
CPC .......... B24D 3/00; B24D 18/00; B24D 99/00; B22F 2005/00; B22F 2005/001; E21B 10/00; E21B 10/45; E21B 10/56; E21B 10/567; E21B 10/55; E21B 10/42; E21B 10/44; B01J 3/00; B01J 3/06; B01J 3/062; C01B 32/25

See application file for complete search history.

(56) References Cited

U.S. PATENT DOCUMENTS 3,148,161 A * 9/1964 Wentorf, Jr. ............. B01J 3/062
252/502
4,518,659 A * 5/1985 Gigl ......................... B01J 3/062
419/11
(Continued)

OTHER PUBLICATIONS https://web.archive.org/web/20050215200836/https://www.finishing.com/132/80.shtml (Year: 2005).*

(Continued)

Primary Examiner — Alexandra M Moore

(57) ABSTRACT

A superabrasive cutter and a method of making the superabrasive cutter are disclosed. The superabrasive cutter may comprise a plurality of polycrystalline superabrasive particles and about 0.01% to about 4% by weight of the superabrasive particles of a dopant as evaluated prior to a high pressure/high temperature process. The dopant may be immiscible with a catalyst for forming the polycrystalline superabrasive particles.

10 Claims, 7 Drawing Sheets

(51) Int. Cl.
*B24D 18/00* (2006.01)
*B24D 99/00* (2010.01)
*C22C 1/00* (2006.01)
*E21B 10/00* (2006.01)
*B22F 7/06* (2006.01)
*C22C 26/00* (2006.01)
*E21B 10/56* (2006.01)
*B22F 5/00* (2006.01)
*B01J 3/06* (2006.01)

(56) References Cited

U.S. PATENT DOCUMENTS

| | | | | |
|---|---|---|---|---|
| 2008/0302579 A1* | 12/2008 | Keshavan | ............... | B22F 7/08 |
| | | | | 175/434 |
| 2010/0166635 A1* | 7/2010 | Sung | ............... | C01B 32/25 |
| | | | | 423/446 |
| 2012/0152622 A1* | 6/2012 | Sue | ............... | E21B 10/567 |
| | | | | 175/428 |
| 2012/0241224 A1* | 9/2012 | Qian | ............... | B22F 5/00 |
| | | | | 175/428 |

OTHER PUBLICATIONS

"Solubility of boron in cobalt", Lerner,C and Cadeville, M.C. Scr. Met., v.7, No. 9, pp. 941-944. Sep. 1, 1973. (Year: 1973).*

* cited by examiner

US 10,695,892 B2

PDC CUTTER WITH CHEMICAL ADDITION FOR ENHANCED ABRASION RESISTANCE

CROSS-REFERENCE TO RELATED APPLICATIONS

The present application is a continuation-in-part of U.S. application Ser. No. 13/926,696, filed Jun. 25, 2013, the entire content of which is hereby incorporated by reference.

TECHNICAL FIELD AND INDUSTRIAL APPLICABILITY

The present disclosure relates generally to superabrasive materials and a method of making superabrasive materials; and more particularly, to a polycrystalline diamond (PDC) cutter with chemical addition for enhanced abrasion and its method of making the same.

SUMMARY

In one embodiment, a superabrasive cutter includes a substrate and a polycrystalline superabrasive composite bonded to the substrate. The polycrystalline superabrasive composite includes a plurality of superabrasive particles that are sintered to form the polycrystalline superabrasive composite in a high pressure/high temperature process, a catalyst that promotes sintering between the superabrasive particles, and about 0.01% to about 4% by weight of the superabrasive particles of a dopant evaluated prior to the high pressure/high temperature process, where the dopant is substantially immiscible with the catalyst and is selected from the group consisting of metals, metal alloys, metalloids, semiconductors, and combinations thereof.

In another embodiment, a method of making superabrasive composite includes mixing a dopant with a plurality of superabrasive particles, positioning the mixture of the plurality of superabrasive particles and the dopant proximate to a substrate that comprises a catalyst that promotes sintering between the superabrasive particles, where the dopant is substantially immiscible with the catalyst, and subjecting the substrate, the plurality of superabrasive particles, and the dopant to conditions of elevated temperature and pressure suitable for producing the polycrystalline superabrasive composite.

In yet another embodiment, a method of making superabrasive composite includes positioning a plurality of superabrasive particles in a can material, positioning dopant proximate to the plurality of suprerabrasive particles in the can material, positioning a substrate that comprises a catalyst proximate to the dopant that is positioned within the can material, where the dopant is substantially immiscible with the catalyst, and subjecting the plurality of superabrasive particles, the dopant, and the substrate to conditions of elevated temperature and pressure suitable for producing the polycrystalline superabrasive composite.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
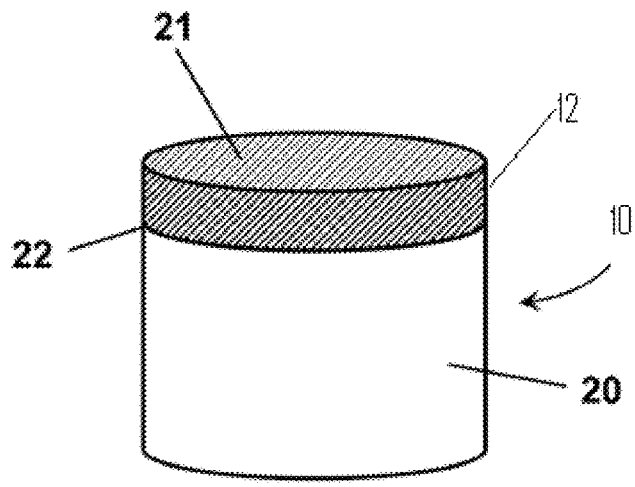
FIG. 1 is schematic perspective view of a cylindrical shape PDC cutter blank produced in a HPHT process.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the end user. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, "about 50" means in the range of 45-55.

As used herein, the term "superabrasive particles" may refer to ultra-hard particles or superabrasive particles having a Knoop hardness of 5000 KHN or greater. The superabrasive particles may include diamond, and cubic boron nitride, for example.

Polycrystalline diamond composite (or "PDC", as used hereafter) may represent a volume of crystalline diamond grains with embedded foreign material filling the inter-grain space. In one particular case, composite comprises crystalline diamond grains, bound to each other by strong diamond-to-diamond bonds and forming a rigid polycrystalline diamond body, and the inter-grain regions, disposed between the bound grains and filled with a catalyst material (e.g. cobalt or its alloys), which was used to promote diamond bonding during fabrication. Suitable metal solvent catalysts may include the metal in Group VIII of the Periodic table. PDC cutting element (or "PDC cutter", as is used hereafter) comprises an above mentioned polycrystalline diamond body attached to a suitable support substrate, e.g., cemented cobalt tungsten carbide (WC—Co), by virtue of the presence of cobalt metal. In another particular case, polycrystalline diamond composite comprises a plurality of crystalline diamond grains, which are not bound to each other, but instead are bound together by foreign bonding materials such as borides, nitrides, carbides, e.g. SiC.

Polycrystalline diamond composites and PDC cutters may be fabricated in different ways and the following examples do not limit a variety of different types of diamond composites and PDC cutters which may be coated according to the embodiment. In one example, PDC cutters are formed by placing a mixture of diamond polycrystalline powder with a suitable solvent catalyst material (e.g. cobalt) proximate to a WC—Co substrate. The assembly is subjected to processing conditions of extremely high pressure and high temperature (HPHT), where the solvent catalyst promotes desired inter-crystalline diamond-to-diamond bonding and, also, provides a binding between polycrystalline diamond body and substrate support. In another example, PDC cutter is formed by placing diamond powder without a catalyst material on the top of substrate containing a catalyst material (e.g. WC—Co substrate). In this example, cobalt catalyst material that contributes to the formation of the polycrystalline diamond compact is supplied from the substrate. Melted cobalt is swept through the diamond powder during the HPHT process. In still another example, a hard polycrystalline diamond composite is fabricated by forming a mixture of diamond powder with silicon powder and mixture is subjected to HPHT process, thus forming a dense polycrystalline cutter where diamond particles are bound together by newly formed SiC material.

Abrasion resistance of polycrystalline diamond composites and PDC cutters may be determined mainly by the strength of bonding between diamond particles (e.g. cobalt catalyst), or, in the case when diamond-to-diamond bonding is absent, by foreign material working as a binder (e.g. SiC binder), or in still another case, by both diamond-to-diamond bonding and foreign binder.

The presence of some catalysts inside the polycrystalline diamond body of PDC cutter promotes the degradation of the cutting edge of the cutter during the cutting process, especially if the edge temperature reaches a high enough critical value. Wear of the cutting edge of the cutter typically introduces a wear scar to the cutter. The wear scar increases the area of contact between the cutter and the material being machined. An increase in the size of the wear scar may increase friction between the cutter and the material being machined, which acts as a parasitic loss to energy that is directed to the cutter. An increase in wear of the cutter, therefore, may reduce the amount of energy that is used to perform the machining operation. In some embodiments, the cobalt driven degradation may be caused by the large difference in thermal expansion between diamond and catalyst (e.g. cobalt metal), and also by catalytic effect of cobalt on diamond graphitization in which the catalyst encourages back-conversion of the diamond to graphite. Removal of catalyst from the polycrystalline diamond body of PDC cutter, for example, by chemical etching in acids, leaves an interconnected network of pores and a residual catalyst (up to 10 vol %) trapped inside the polycrystalline diamond body. It has been demonstrated that a chemically etched polycrystalline diamond cutter by removal of a substantial amount of cobalt from the PDC cutter significantly improves its abrasion resistance. Also it follows that a thicker cobalt depleted layer near the cutting edge provides better abrasion resistance of the PDC cutter than a thinner cobalt depleted layer.

Embodiments disclose that a dopant that is non-catalytic with the superabrasive particles (for example, metal or a metal alloy, metalloids, semiconductors, and combinations thereof) may be blended with superabrasive particles. A superabrasive volume mixed with the dopant may be pressed in an elevated pressure and temperature in a high pressure/high temperature sintering process. Examples of such dopants may include metals or metal alloys such as copper, gallium, lead, tin, bismuth, indium, thallium, and alloys thereof; metalloids such as antimony or tellurium; and semiconductors such as bismuth telluride or germanium. The dopant may have a melting point lower than the catalyst. The dopant may melt at low temperature than the catalyst, thereby allowing for enhanced rearrangement of the diamond grains during the HPHT process and increasing diamond density in the resulting PDC cutters.

In embodiments according to the present disclosure, the dopant may be substantially immiscible with the catalyst. As used herein, "substantially immiscible" should be interpreted to mean that the dopant has a low propensity to form an alloy with the catalyst when both are held above their respective melting points. In one embodiment, the dopant may have a solubility of less than about 1.0 at % with the catalyst.

In one embodiment, the dopant may provide protection to free surfaces of the diamond, preventing diamond from graphitization during the HPHT process at a time before the catalyst is introduced to the diamond and thereby enhancing sintering of the polycrystalline diamond composite. The catalyst, for example, cobalt, may be swept from the substrate, for example tungsten carbide, during the time period that the diamond and the substrate are subjected to elevated temperature and pressure. It is conventionally known that certain dopants, for example, lead, melt at temperatures significantly below that of cobalt at pressures lower than about 200 kbar. Because the dopant is molten for a period of time prior to the catalyst being molten, the dopant may partial fill the pore structure existing between the diamond crystals. The delay between the time at the dopant being molten and the catalyst being molten may also allow for some rearrangement of the diamond grains. The molten lead may also allow for enhanced pressure transmission to the free surfaces of the diamond grains prior to the onset of the catalyst-sweep/sinter process. Additionally, the lead may coat the surface of individual diamond crystals, and thereby act as a barrier that inhibits a conversion from diamond to graphite or other glassy carbon forms. Upon reaching sufficient temperature for the melting of cobalt, the liquid cobalt sweeps through the pore structure of the arranged diamond. The catalyst increases the rate of formation of diamond-to-diamond bonds, thereby forming the polycrystalline diamond composite.

Owing to the low solubility of the dopant in the catalyst, the sweep of the catalyst through the diamond is thought to push the majority of the dopant that was originally introduced to the diamond particles out of the polycrystalline diamond composite and towards the top of a can opposite the substrate. Dopant may remain, however, in interstitial voids between bonded diamond grains in the polycrystalline diamond composite. Such dopant that remains in the interstitial voids may be inspected through a variety of conventional destructive and non-destructive inspection techniques including, for example and without limitation, x-ray diffraction, x-ray fluorescence, energy dispersive spectroscopy, scanning electron microscopy, transmission electron microscopy, and the like.

As shown in FIG. 1, a superabrasive cutter 10 which is insertable within a downhole tool, such as a drill bit (not shown) in according to an embodiment is depicted. One example of the superabrasive cutter 10 may include a superabrasive volume 12 having a top surface 21. The superabrasive volume 12 of the superabrasive cutter 10 may be coupled to a substrate 20. The superabrasive cutter 10 may be formed from a plurality of polycrystalline superabrasive particles, a catalyst, and about 0.01% to about 4% by weight of the superabrasive particles of a dopant, as evaluated prior to introduction of the components of the superabrasive volume to a high pressure/high temperature process. The dopant may be substantially immiscible with the catalyst that promotes sintering between the superabrasive particles to form the polycrystalline superabrasive compact. In one embodiment, the dopant is present in an amount by weight of the superabrasive particles of less than about 1.0% as evaluated prior to introduction of the components to a high pressure/high temperature process. In another embodiment, the dopant is present in an amount by weight of the superabrasive particles of less than about 2.0% as evaluated prior to the introduction of the components to a high pressure/high temperature process.

The superabrasive cutter 10 may include a substrate 20 attached to the superabrasive volume 12 formed by the polycrystalline superabrasive particles. The substrate 20 may be a metal carbide, for example tungsten carbide, that is attached to the superabrasive volume 12 via an interface 22 between the superabrasive volume 12 and the substrate 20. The substrate 20 may be generally made from cemented cobalt tungsten carbide, or tungsten carbide, while the superabrasive volume 12 may be formed using a polycrystalline ultra-hard material layer, such as polycrystalline diamond, polycrystalline cubic boron nitride ("PCBN"), or tungsten carbide mixed with diamond crystals (impregnated segments). The superabrasive particles may be selected from a group of cubic boron nitride, diamond, and diamond composite materials.

As discussed hereinabove, the dopant may be selected from a group of materials that includes metals, metal alloys, metalloids, semiconductors, or combinations thereof. The metal or metal alloy may include at least one of copper, gallium, lead, tin, bismuth, indium, thallium, and alloys thereof. The metalloids may include at least one of antimony or tellurium. The semiconductors may include at least one of germanium or bismuth telluride. The dopant may be distributed throughout the polycrystalline superabrasive particles. Concentration of the dopant may be higher on the top surface 21 (i.e., spaced apart from the substrate 20) of the superabrasive volume 12 than that on the interface 22 (i.e., proximate to the substrate 20). The concentration gradient of the dopant may be caused by the sweeping of the catalyst from the substrate 20 at elevated temperature and pressure. In some embodiments, an overall concentration of the dopant in the superabrasive volume 12 may be less than that of a catalyst that is swept into the superabrasive volume 12 for forming the polycrystalline superabrasive particles. In other embodiments, the overall concentration of the dopant in the superabrasive volume 12 may be greater than that of the catalyst. The catalyst for forming the polycrystalline superabrasive particles may be cobalt. The catalyst may be present in the superabrasive volume in a concentration corresponding to about 5 to 10% by weight of the superabrasive particles as evaluated following the performance of the high pressure/high temperature process. The dopant may have a melting point lower than the catalyst.

The superabrasive cutter 10 may be fabricated according to processes known to persons having ordinary skill in the art. The cutting element 10 may be referred to as a polycrystalline diamond compact ("PDC") cutter when polycrystalline diamond is used to form the polycrystalline volume 12. PDC cutters are known for their toughness and durability, which allow them to be an effective cutting insert in demanding applications. Although one type of superabrasive cutter 10 has been described, other types of superabrasive cutter 10 may incorporate the combination of elements disclosed herein. For example, in some embodiments, superabrasive cutter 10 may have a chamfer (not shown in FIG. 1) around an outer periphery of the top surface 21. The chamfer may have a vertical height of about 0.5 mm and an angle of about 45° degrees, for example, which may provide a particularly strong and fracture resistant tool component.

Figure 2:
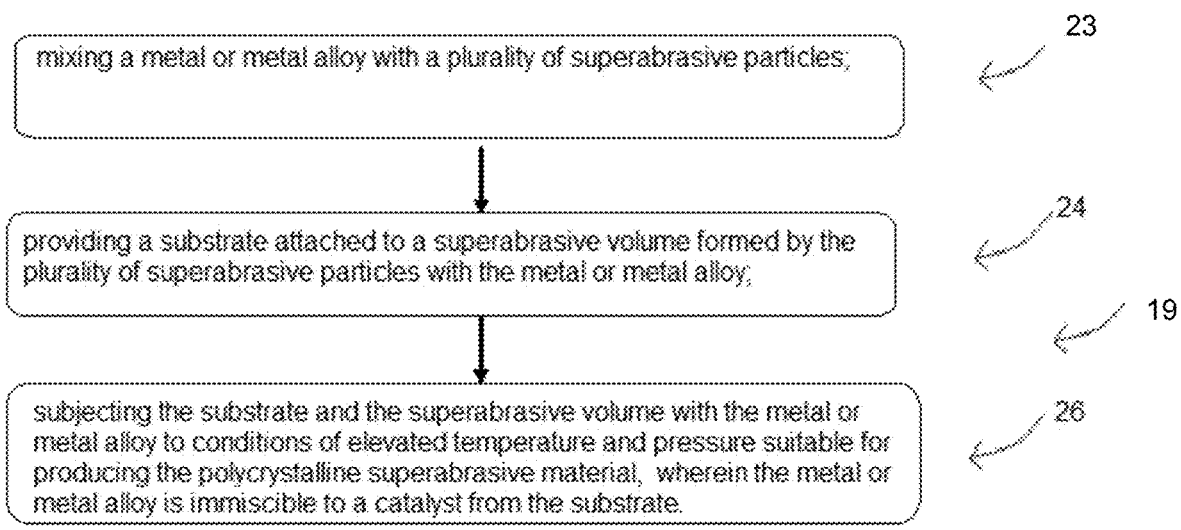
FIG. 2 is a flow chart illustrating a method of manufacturing a PDC cutter blank according to an embodiment.

As shown in FIG. 2, a method 20 of making superabrasive material may comprise steps of mixing a dopant with a plurality of superabrasive particles in a step 22; providing a substrate attached to a superabrasive volume formed by the plurality of superabrasive particles with the dopant in a step 24; and subjecting the substrate and the superabrasive volume with the dopant to conditions of elevated temperature and pressure suitable for producing the polycrystalline superabrasive material, wherein the dopant is substantially immiscible to a catalyst that is introduced from the substrate in a step 26. By introducing the dopant, the density of the superabrasive particles may be increased as evaluated prior to the superabrasive particles being subjected to conditions of elevated temperature and pressure.

The method 20 may include a step of surrounding the superabrasive particles with the dopant to protect the diamond in the polycrystalline superabrasive composite from converting back to graphite. As conventionally known, the catalyst from the substrate that assists with the formation of diamond-to-diamond bonds may also increase the rate of conversion of the diamond back to graphite. By introducing the dopant, the catalysts around superabrasive particles may be replaced by the dopant, thereby displacing catalyst from some regions of contact proximate to the superabrasive particles. The reduction in catalyst content within the polycrystalline superabrasive composite, therefore, may reduce the rate of back-conversion of the superabrasive particles. The abrasion resistance of the superabrasive cutter may, in turn, be increased. The abrasion resistance of the superabrasive cutter may be particularly increased for abrasion that occurs at high temperature.

In one embodiment, the method 20 may include a step of mixing a dopant with a plurality of superabrasive particles to form a superabrasive volume. In another embodiment, the method 20 may include a step of sandwiching the superabrasive particles with mixture of the metal or metal alloy between the substrate and the superabrasive particles without mixing with the metal or metal alloy. At an elevated temperature and pressure, the catalyst from the substrate may sweep into the superabrasive particles with the dopant and may push at least a part of the catalyst into the layer of superabrasive particles without the mixture of the dopant.

As conventionally known, some embodiments may subject the polycrystalline superabrasive composite to a leaching process in which the polycrystalline superabrasive compact is introduced to an acid. The acid may be selected from a variety of conventionally-known compositions in which the catalyst is known to dissolve. By dissolving and removing at least a portion of the catalyst from the polycrystalline diamond composite, the abrasion resistance of the polycrystalline diamond composite may be increased due to the reduction in backconversion rate of the polycrystalline diamond composite to graphite.

Figure 9:
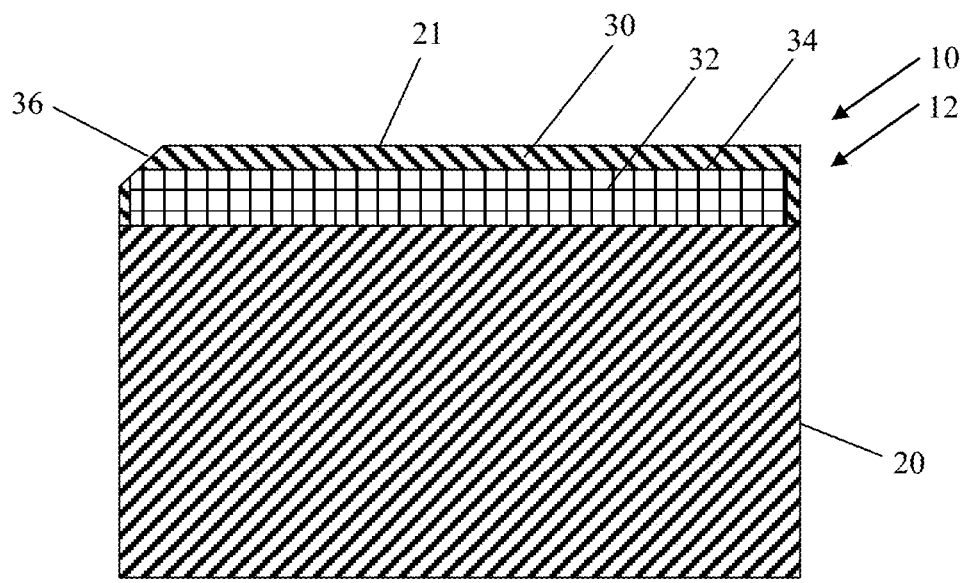
FIG. 9 is a schematic view of a PDC cutter blank that has been acid leached according to an embodiment.

Referring now to FIG. 9, an embodiment of a cutting element having a polycrystalline diamond composite layer is depicted in cross-section. It should be understood that the cutting element may have a variety of shapes and configurations. The disclosure, therefore, should not be thought to be limited to the shapes and configurations shown and described herein. In the depicted embodiment, the top surface 21 of the cutting element 10 may be treated in a mixture of acids in order to remove catalyst and/or dopant from the regions of the cutting element 10 that are proximate to the cutting element 10. The superabrasive volume 12 may include a first polycrystalline element zone 30 and a second polycrystalline element zone 32, where the first polycrystalline element zone 30 and the second polycrystalline element zone 32 abut one another at a transition zone 34. The first polycrystalline element zone 30 may be substantially free of catalyst and/or dopant. The second polycrystalline element zone 32 may be rich in catalyst and/or dopant. Following processing by the high pressure/high temperature process, the polycrystalline composite may include a plurality of interstitial regions that are formed between adjacent superabrasive grains. These interstitial regions may be "locked" such that acid that is introduced in the leaching process is unable to reach these interstitial regions. These interstitial regions, therefore, may contain material that was present in previous manufacturing operations.

When cutting elements 10 that have been leached to form the first polycrystalline element zone 30 and the second polycrystalline element zone 32 are subjected to abrasive wearing in which the longitudinal axis of the cutting element 10 is inclined relative to the material being machined, the cutting element 10 will exhibit wear along the edge proximate to the top surface 21. The wear that is introduced to the cutting element 10 forms a wear scar 36 at locations proximate to contact between the cutting element 10 and the material being machined. Upon initial machining, the wear scar 36 forms in the first polycrystalline element zone 30. Upon subsequent machining, the wear scar 36 continues to increase in size, including where the wear scar 36 exposes both the first polycrystalline element zone 30 and the second polycrystalline element zone 34.

One or more steps may be inserted in between or substituted for each of the foregoing steps 22-26 without departing from the scope of this disclosure.

Example 1

Diamond crystals with an average particle size of 18 micrometers were thoroughly mixed with 1 wt % fine lead powder, based on the diamond weight. This blend was then placed into a can material with a cobalt cemented tungsten carbide substrate, loaded into a high pressure cell with the appropriate gasketing materials. The blend together with the cobalt cemented tungsten carbide substrate was pressed under HP/HT conditions in a high pressure high temperature apparatus. In this example, the press was a belt press apparatus, and the cutters were pressed at greater than 55 kbar pressure and temperatures in excess of 1400° C.

Figure 3:
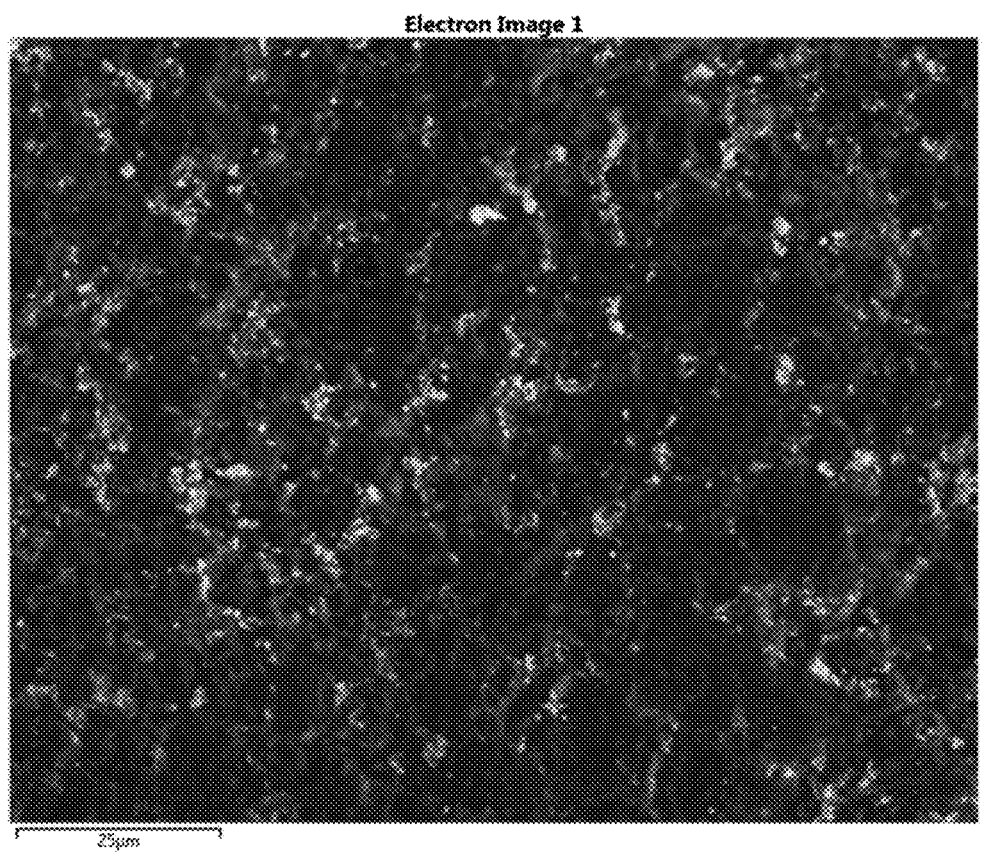
FIG. 3 is a back scattered scanning electron microscope (SEM) micrograph of the lapped diamond surface according to an embodiment.
Figure 4:
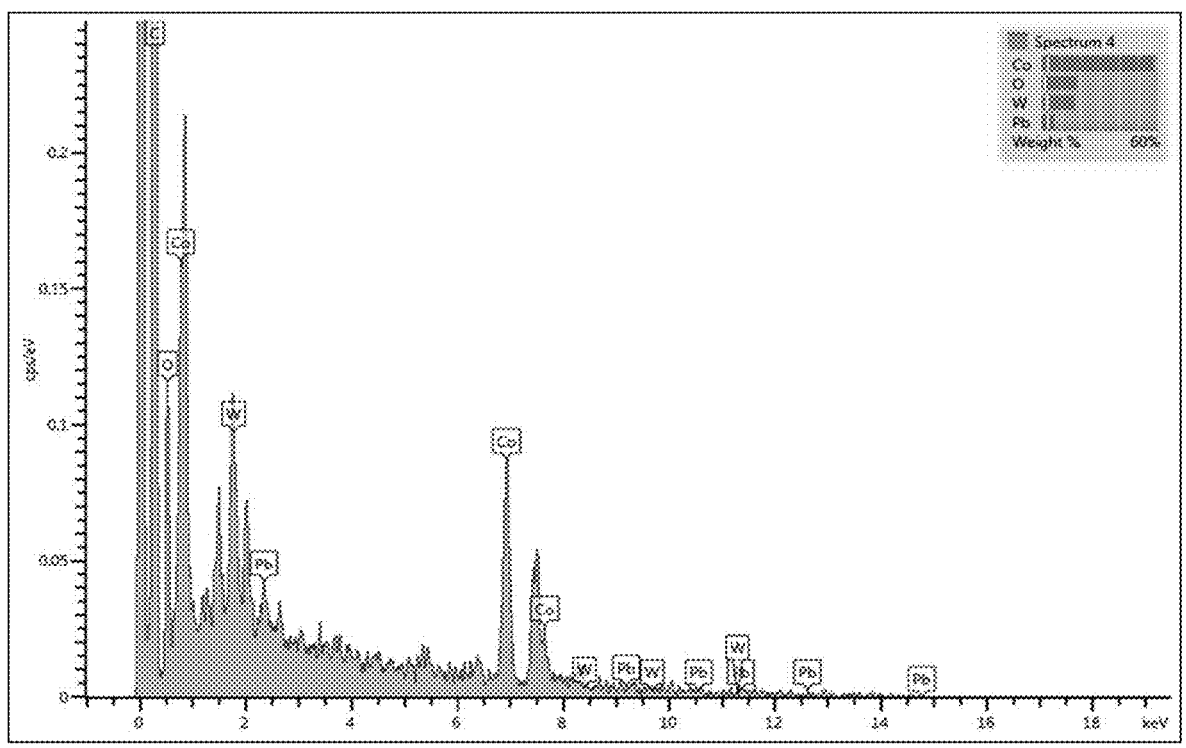
FIG. 4 is an energy dispersive spectrum with beam focused on a bright spot in the microstructure shown in FIG. 3.
Figure 5:
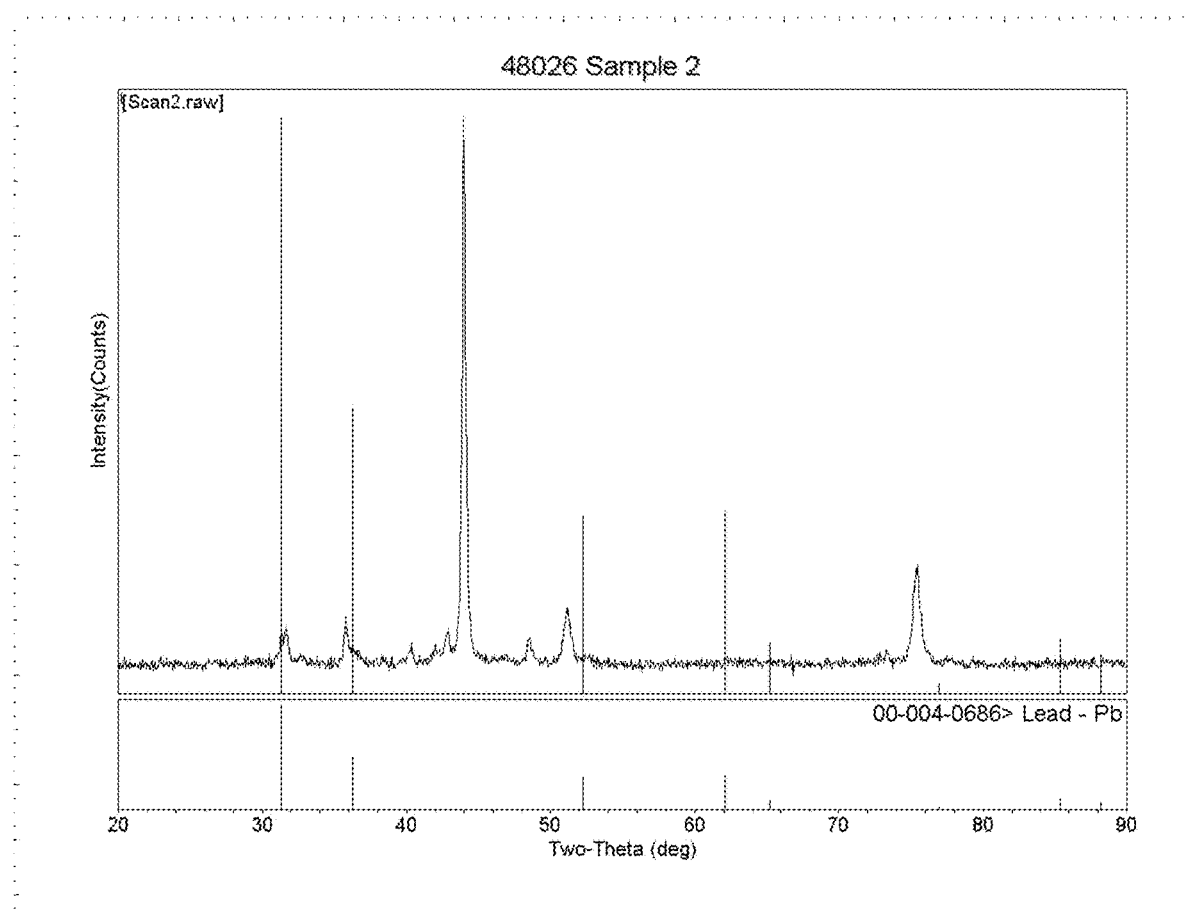
FIG. 5 is an X-ray diffraction spectrum on the lapped diamond surface according to an embodiment.

After being removed from the high pressure apparatus and gasketing material, the resulting body was ground to final dimensions and the diamond thickness was lapped to the desired thickness, which resulted in the removal of the majority of the lead present in the diamond structure, leaving a portion of the lead remaining in the microstructure, as shown in FIG. 3. In this scanning electron microscope (SEM) micrograph of the lapped diamond surface, three phases were detectable. The dark grains constituting the majority of the microstructure were grains of diamond. The dark gray phase between the diamond grains was the sweep metal, containing cobalt and tungsten from the sweep. Isolated bright spots within the microstructure contain a significant lead signal from the energy dispersive spectrometer (EDS), as shown in FIG. 4. Due to electron beam spreading and the ability for the electron beam in the microscope to penetrate a depth into the microstructure, a signal from cobalt, tungsten, and carbon were also displayed when obtaining the spectrum with the beam focused on a bright spot in the microstructure. X-ray diffraction (XRD) on the lapped diamond surface confirmed that these isolated pockets were metallic lead and not a reaction phase resulting from the reaction of lead with the other chemical species present in the system, as shown in FIG. 5.

A bevel of 45 degrees was ground onto the cutting edge of the cutters. The cutters were tested on a vertical turret lathe (VTL) in testing methodology. Specifically, the cutter was tested such that the depth of cut is between 0.010" and 0.030" in one example, between 0.015" and 0.017" in another example, under a continuous flood of cooling fluid. The table may be rotated at a variable speed such that the cutter machined a constant amount of linear feet per minute. The surface feet per minute were between 200 and 600 in one example, between 350 and 425 feet/minute in another example. The cutter was cross-fed into the rock at a constant rate between 0.100" and 0.300" per revolution of the table. The cutter was mounted into a fixture at an incline, with a rake angle between −5 and −20 degrees in one embodiment, between −12 and −16 degrees in another embodiment. The rock used in the test was a member of the granite family of rocks.

The depth of cut was typically 0.005" to 0.020" in one embodiment, between 0.008 and 0.011" in another embodiment. The table rotated at a constant speed, between 20 and 80 RPM in one embodiment, between 60 and 80 RPM in another embodiment. The cross feed rate was held constant between 0.150" and 0.500" per revolution of the table in one embodiment, between 0.250" and 0.400" in another embodiment.

The constant table speed and increased cross feed rate resulted in a variable rate of surface feet of rock machined per minute throughout a pass across the rock, subjecting a cutter to a complex thermal cycle, which imparted a high thermal load on cutters at the beginning of each pass, and gradually decreased as the cutter moved towards the center of the table.

Figure 6:
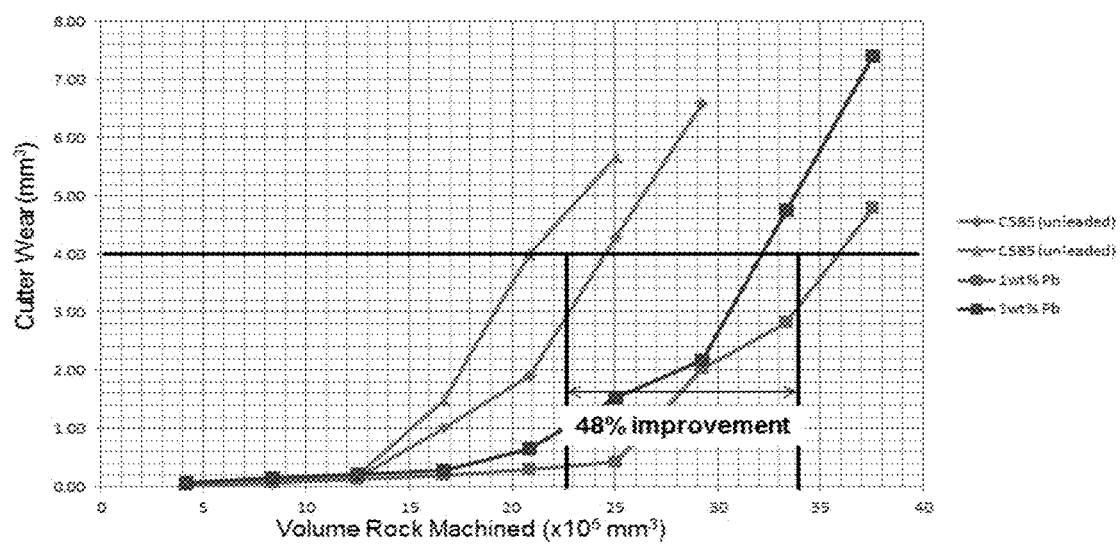
FIG. 6 shows a PDC cutter wear as a function of the volume of rock removed from the vertical turret lathe (VTL) by the PDC cutter.

Cutters produced with and without lead were tested in a high thermal abrasion test, and the wear of the cutter was measured at predetermined intervals. FIG. 6 shows the cutter wear as a function of the volume of rock removed from the lathe by the cutter. This test was repeated, and the cutter containing 1 wt/% lead machined 48% more rock to reach a cutter wear of 4 mm$^3$.

Example 2

Figure 7:
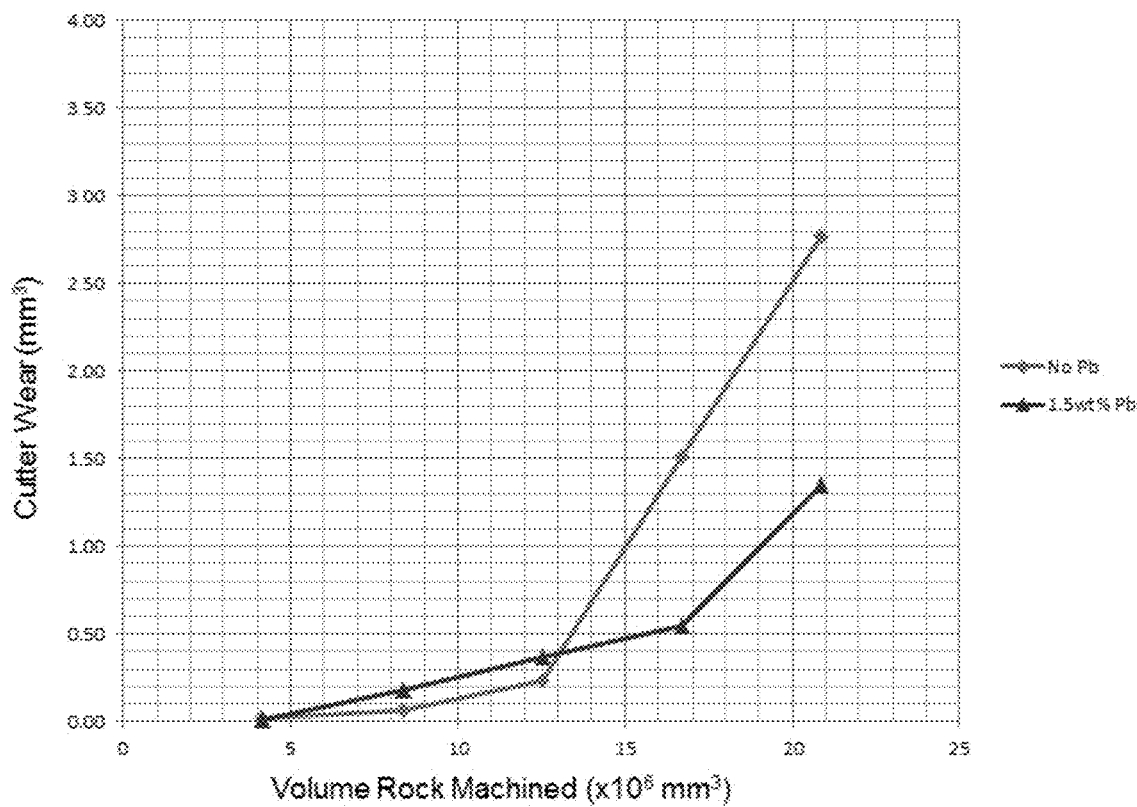
FIG. 7 shows the wear progress of PDC cutters illustrating the PDC cutter containing 1.5 wt % lead outperformed the PDC cutter which did not contain lead.

The procedure used in Example 1 was repeated with a coarser diamond grain size. Here, the average diamond particle size was about 22 microns, and was mixed with 1.5 wt % lead, based on the diamond weight. Again, cutters with and without lead additions were produced, and these cutters were tested in a high thermal abrasion test on the VTL. FIG. 7 shows the wear progress of these cutters where the cutter containing lead outperformed the cutter which did not contain lead. Here, the lead containing cutter machined about 27% more rock to reach about 1 mm$^3$ wear.

Example 3

Figure 8:
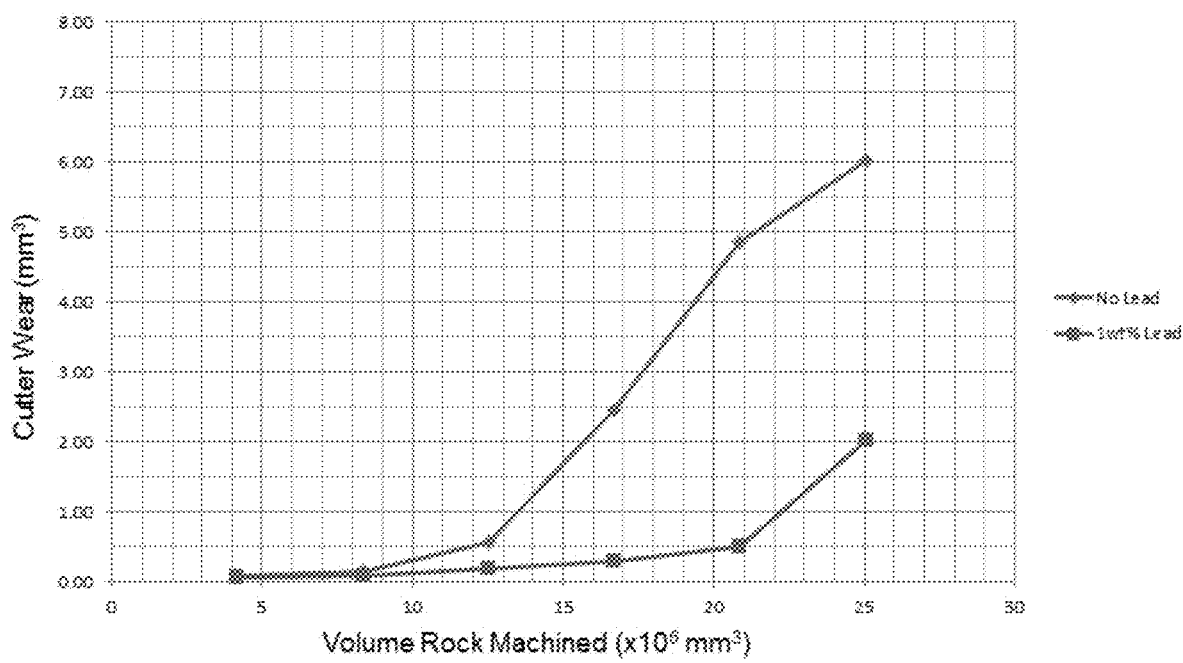
FIG. 8 shows the wear progress of PDC cutters illustrating the PDC cutter containing 1.0 wt % lead outperformed the PDC cutter which did not contain lead.

The procedure used in Examples 1 and 2 was repeated with a finer diamond grain size. Here the average diamond particle size was about 12 microns, and 1 wt % lead was mixed in, based on the diamond weight. Cutters with and without lead were produced and tested in the thermal abrasion test on the VTL, as shown in FIG. 8. The cutter containing lead machined about 58% more rock to reach a cutter wear of 2 mm$^3$ than the cutter without lead.

While reference has been made to specific embodiments, it is apparent that other embodiments and variations can be devised by others skilled in the art without departing from their spirit and scope. The appended claims are intended to be construed to include all such embodiments and equivalent variations.

Example 4

The procedure used in Example 1 was repeated with a larger concentration of lead and subsequently leached to remove the catalyst from the top surface of the cutter. Here, the average diamond particle size was about 17 microns. Lead was mixed with the diamond particles in an amount corresponding to 1.25 wt % based on the diamond weight. The blend of diamond particles and lead, together with a tungsten carbide substrate having 9.5 wt % cobalt were pressed under HP/HT conditions in a high pressure high temperature apparatus. In this example, the press was a belt press apparatus, and the cutters were pressed at greater than 55 kbar pressure and temperatures in excess of 1400° C.

The resulting cutters were introduced to an acid bath at an elevated temperature for a duration of time sufficient to remove substantially all of the cobalt catalyst from the region of the cutter proximate to the top surface.

Cutters produced according to Example 4 were evaluated using a variety of non-destructive inspection techniques. Cutters produced according to Example 4 were evaluated using X-ray florescence, which, when the cutters were evaluate along the leached surfaces that are substantially free of catalyst (cobalt) and dopant (lead), indicated spectral lines corresponding to cobalt and lead. Additionally, cutters produced according to Example 4 were destructively tested through Transmission Electron Microscopy, in which interstitial voids between bonded diamond particles were identified to contain cobalt, lead, or a combination of cobalt and lead.

Example 5

Comparative Example

The procedure used in Example 1 was repeated to produce cutters that were subsequently leached to remove the catalyst from the top surface of the cutter. Here, the average diamond particle size was about 17 microns. The diamond particles, together with a tungsten carbide substrate having 12.5 wt % cobalt were pressed under HP/HT conditions in a high pressure high temperature apparatus. In this example, the press was a belt press apparatus, and the cutters were pressed at greater than 55 kbar pressure and temperatures in excess of 1400° C.

The resulting cutters were introduced to an acid bath at an elevated temperature for a duration of time sufficient to remove substantially all of the cobalt catalyst from the region of the cutter proximate to the top surface.

Figure 10:
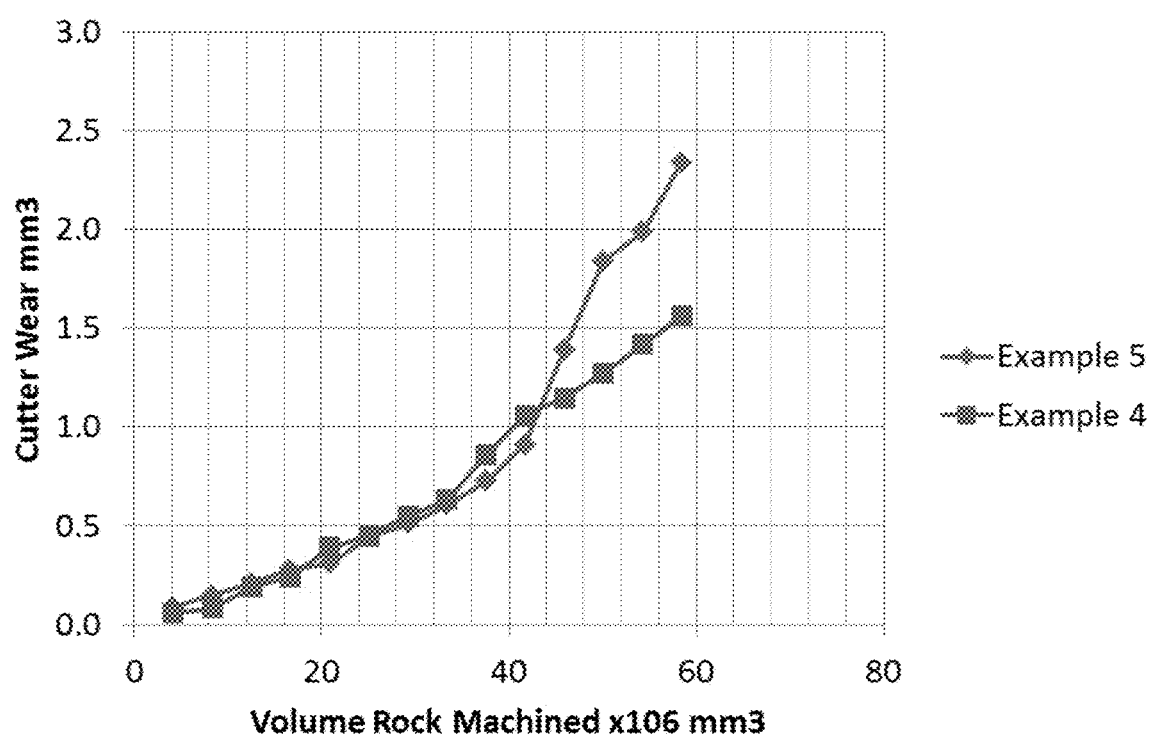
FIG. 10 shows PDC cutter wear as a function of the volume of rock removed from the VTL by the PDC cutters.

Cutters produced in accordance with Example 4 and Example 5 were tested in a thermal abrasion test on the VTL. The cutters were evaluated with a 0.010 inch depth of cut, a cross-feed of 0.300 inch per revolution of the table, and a maximum material feed rate of 1100 surface feet per minute. Conditions of the test are believed to subject the cutter to high abrasion and thermal load. The results of the testing are shown in FIG. 10. As depicted, both of the catalyst-leached cutters of Examples 4 and 5 exhibited similar performance from the initiation of the testing to the point corresponding to about 41.74×10$^6$ mm$^3$ of rock machined. In both of the cutters, this data point approximately corresponds to the conditions at which the cutter has worn sufficiently to expose the second polycrystalline superabrasive zone of the cutter in which catalyst was not removed. As discussed hereinabove, significant catalyst remains in this second polycrystalline superabrasive zone.

The data corresponding to Example 5 exhibits an increase in wear rate of the superabrasive cutter as rock is continued to be machined by the superabrasive cutter. As discussed hereinabove, this wear rate may accelerate due to an increase in stress caused by the mismatch in the coefficient of thermal expansion between the diamond and the cobalt, as well as the increase in back-conversion rate of diamond to graphite, which is enhanced by the presence of cobalt.

In comparison, the cutter of Example 4 that included the additional lead dopant did not have a significant increase in the wear rate of the cutter as the cutter was worn to expose the second polycrystalline superabrasive zone that contained cobalt. Instead, the wear rate of the cutter continued at approximately its previous rate corresponding to wear scars at which only the first polycrystalline superabrasive zone was exposed.

Data of cutter wear vs. volume of rock machined corresponding to FIG. 10 is reproduced below in Tables 1 and 2. A cutter wear rate equal to the increase in cutter wear divided by the increase in the volume of rock machined was calculated for each adjacent set of data points. The cutter wear rate, therefore, provides an average of how much cutter volume is worn from the cutter for the amount of volume that is machine for the rock between the points in time at which samples were taken. Based on the cutter wear rate, a linear estimate of the anticipated cutter wear was calculated using the cutter wear rate from the immediately previous data set. The anticipated cutter wear was compared with the measured cutter wear to evaluate the error between the estimated wear and the actual wear of the cutter.

TABLE 2

| Cutter Wear for Rock Volume Machined for Cutter Produced According to Example 4 Rock Volume Machined (×10⁶ mm³) | Cutter Wear (mm³) | Cutter Wear Rate (10⁻⁶ mm³/mm³) | Anticipated Cutter Wear (mm³) | Error (%) |
|---|---|---|---|---|
| 4.174 | 0.057 | — | — | — |
| 8.349 | 0.082 | 0.006 | — | — |
| 12.523 | 0.189 | 0.026 | 0.107 | 77.19% |
| 16.697 | 0.241 | 0.013 | 0.296 | −18.44% |
| 20.872 | 0.389 | 0.036 | 0.294 | 32.68% |
| 25.046 | 0.448 | 0.014 | 0.538 | −16.70% |
| 29.220 | 0.548 | 0.024 | 0.507 | 8.21% |
| 13.395 | 0.633 | 0.020 | 0.648 | −2.32% |
| 17.569 | 0.860 | 0.054 | 0.718 | 19.67% |
| 41.743 | 1.060 | 0.048 | 1.086 | −2.39% |
| 45.917 | 1.147 | 0.021 | 1.261 | −8.984% |
| 50.092 | 1.272 | 0.030 | 1.235 | 3.01% |
| 54.266 | 1.417 | 0.035 | 1.496 | 1.52% |
| 58.440 | 1.562 | 0.035 | 1.563 | −0.07% |

TABLE 2

Cutter Wear for Rock Volume Machined for Cutter Produced According to Example 5

| Rock Volume Machined (×10⁶ mm³) | Cutter Wear (mm³) | Cutter Wear Rate (×10⁻⁶ mm³/mm³) | Anticipated Cutter Wear (mm³) | Error (%) |
|---|---|---|---|---|
| 4.174 | 0.090 | — | — | — |
| 8.349 | 0.1481 | 0.014 | — | — |
| 12.523 | 0.207 | 0.014 | 0.206 | 0.60% |
| 16.697 | 0:279 | 0.017 | 0.266 | 4.73% |
| 20.872 | 0.307 | 0.007 | 0.351 | −12.45% |
| 25.046 | 0.444 | 0.033 | 0.335 | 32.51% |
| 29.220 | 0.507 | 0.015 | 0.581 | −12.67% |
| 33.395 | 0.608 | 0.024 | 0.570 | 6.68% |
| 37.569 | 0.724 | 0.028 | 0.710 | 2.07% |
| 41.743 | 0.910 | 0.045 | 0.841 | 8.30% |
| 45.917 | 1.391 | 0.115 | 1.096 | 26.85% |
| 50.092 | 1.838 | 0.107 | 1.871 | −1.73% |
| 54.266 | 1.985 | 0.035 | 2.286 | −13.20% |
| 58.440 | 2.338 | 0.085 | 2.131 | 9.74% |

As depicted in the data and illustrated by the calculation of error, at data points at which the second polycrystalline superabrasive zone is not exposed (i.e., data points at which the cobalt-rich zone remains spaced apart from the wear scar of the cutter) the wear of the cutter increases at a similar rate with increasing volume of rock machined. Evaluating the data indicates that, while there is some noise in the data of both populations, Example 5 exhibits a marked increase in the wear rate of the dopant-free cutter. The cutter exhibits the increase in wear rate at a point that corresponds to the second polycrystalline superabrasive zone, which is rich in catalyst, being exposed at the wear scar of the cutter. After the second polycrystalline superabrasive zone is exposed to the wear scar, the wear rate of the cutter generally increases.

In contrast, the cutter of Example 4, which includes lead dopant, does not exhibit an increase in the wear rate when the second polycrystalline superabrasive zone is exposed to the wear scar. Accordingly, the cutter according to Example 4 is able to remove a significantly more rock material than the cutter according to Example 5 for the same amount of cutter wear.

As illustrated by the data sets corresponding to the cutters of Examples 4 and 5, the cutter according to Example 5 has an increase in the wear rate that is larger than the increase in the wear rate of the cutter according to Example 4. Cutters according to Example 4 may exhibit an increase in wear rate that is within about 10% of the predicted wear rate based on the immediately previous data points. In one embodiment, the difference between the increase in wear rate is within about one standard deviation of the cumulative errors of wear rate in which the second polycrystalline superabrasive zone of the cutter is spaced apart from the wear scar (the standard deviation of errors of Example 4 evaluated from initiation to 41.74 mm³ of rock volume machined is equal to 31.42%). In contrast, the wear of cutters according to Example 5 increases more as the second polycrystalline superabrasive zone is exposed to the wear scar. Based on the data provided in Table 21, the cutter increased in wear about 27% more than predicted when the second polycrystalline superabrasive zone was exposed to the wear scar. This increase was about 1.9 standard deviations of the cumulative errors of wear rate in which the second polycrystalline superabrasive zone of the cutter was spaced apart from the wear scar (the standard deviation of errors of Example 5 evaluated from initiation to 41.74 mm³ of rock volume machined is equal to 14.15%).

Figure 11:
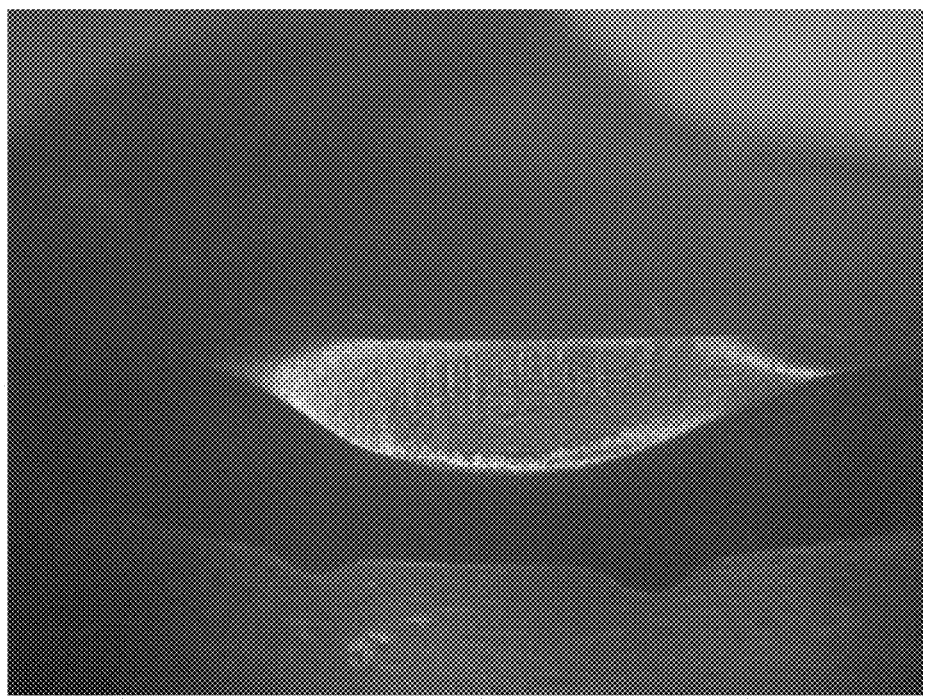
FIG. 11 is a micrograph of a cutter produced according to Example 4 showing the wear scar after about $58 \times 10^6$ mm$^3$ rock machined.
Figure 12:
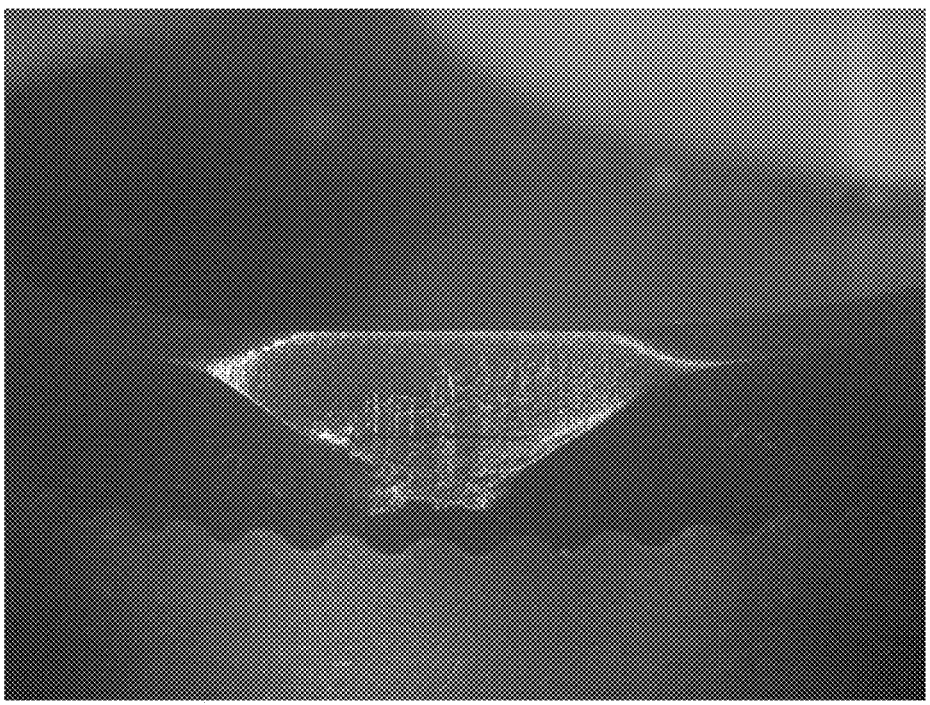
FIG. 12 is a micrograph of a cutter produced according to Example 5 showing the wear scar after about $58 \times 10^6$ mm$^3$ rock machined.

Micrographs of cutters produced in accordance with Example 4 (FIG. 11) and Example 5 (FIG. 12) are reproduced herein. As can be seen from the micrographs, the wear scar of the cutter produced according to Example 4 exhibits a more even wear surface across the wear scar as compared to the cutter produced according to Example 5.

What is claimed is:

1. A superabrasive cutter, comprising:
   a substrate; and
   a polycrystalline superabrasive composite bonded to the substrate, the polycrystalline superabrasive composite comprising:
      a plurality of superabrasive particles that are sintered to form the polycrystalline superabrasive composite in a high pressure/high temperature process;
      a catalyst that promotes sintering between the superabrasive particles; and
      about 0.01% to about 4% by weight of the superabrasive particles of a dopant evaluated prior to and before the high pressure/high temperature process is performed,
   wherein when the dopant and the catalyst are both are held above their respective melting points, the dopant is substantially immiscible with the catalyst and is a semiconductor comprising at least one of bismuth telluride or germanium, and
   wherein the dopant has a solubility of less than about 1.0% with the catalyst.

2. The superabrasive cutter of claim 1, wherein the superabrasive particles are selected from a group of cubic boron nitride, diamond, and diamond composite materials.

3. The superabrasive cutter of claim 1, wherein the dopant optionally further includes a metalloid comprising at least one of antimony or tellurium.

4. The superabrasive cutter of claim 1, wherein the dopant has a lower melting temperature than the catalyst.

5. The superabrasive cutter of claim 1, wherein the dopant is present in an amount by weight of the superabrasive particles of less than about 1.0% evaluated prior to the high pressure/high temperature process.

6. The superabrasive cutter of claim 1, wherein the dopant is present in an amount by weight of the superabrasive particles in a range from about 1.0% to about 2.0% evaluated prior to the high pressure/high temperature process.

7. The superabrasive cutter of claim 6, wherein the dopant is present in an amount by weight of the superabrasive particles of less than about 1.5% evaluated prior to the high pressure/high temperature process.

8. The superabrasive cutter of claim 1, wherein the dopant is distributed throughout the polycrystalline superabrasive particles.

9. The superabrasive cutter of claim 1, wherein the polycrystalline superabrasive composite comprises a first polycrystalline superabrasive zone that is absent of any catalyst material beyond unavoidable remnants of the catalyst and that is positioned distally from the substrate and a second polycrystalline superabrasive zone that contains the catalyst material beyond unavoidable remnants and that is positioned proximally to the substrate.

10. The superabrasive cutter of claim 1, wherein the dopant is present in the polycrystalline superabrasive composite following the high pressure/high temperature process.

* * * * *